Figure 1:
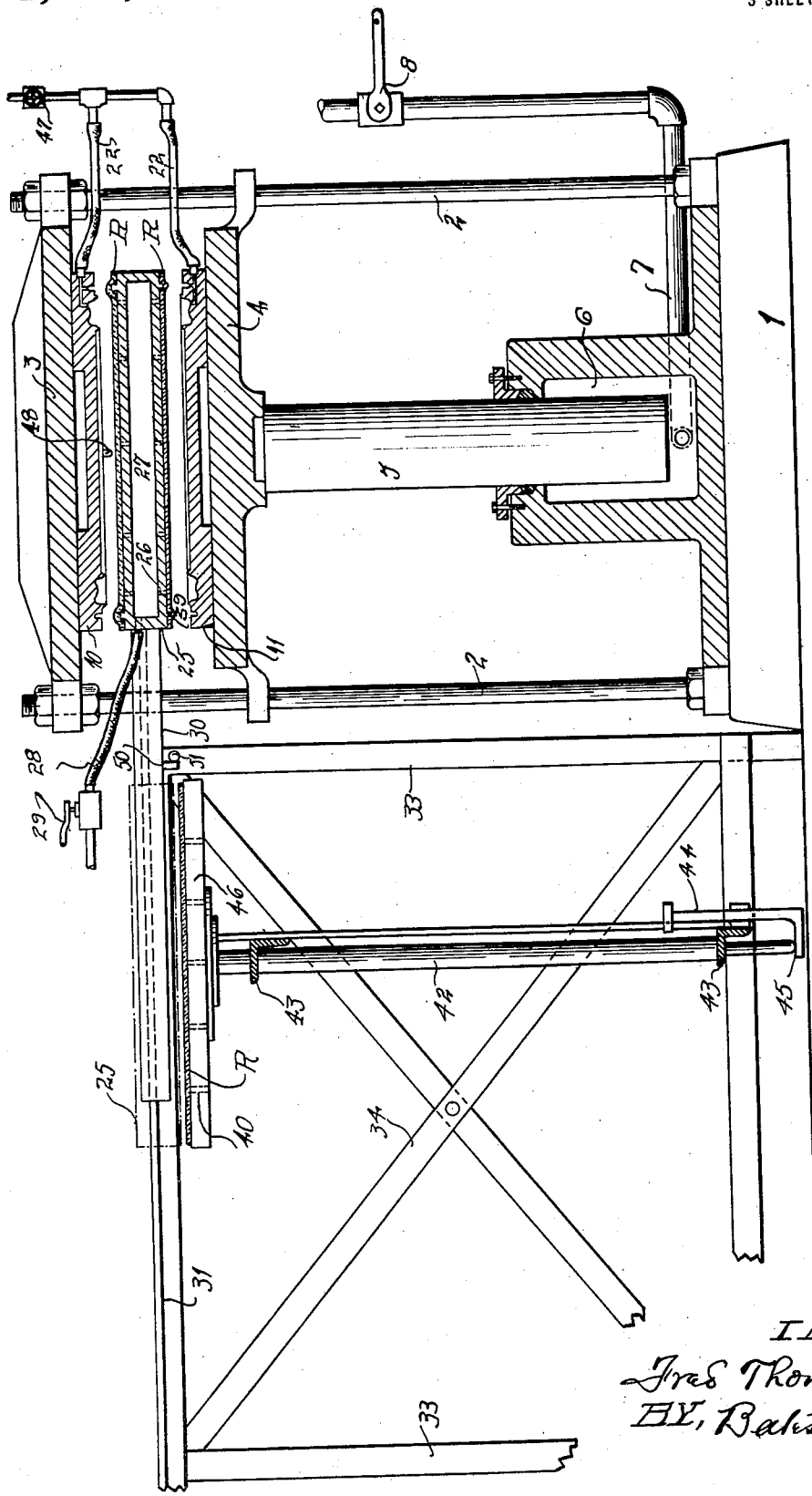

F. T. ROBERTS.
METHOD OF MAKING HOLLOW RUBBER ARTICLES.
APPLICATION FILED MAR. 12, 1917.

1,346,848.

Patented July 20, 1920.
3 SHEETS—SHEET 1.

INVENTOR,
Fred Thomas Roberts,
BY, Bates & Macklin,
ATTYS.

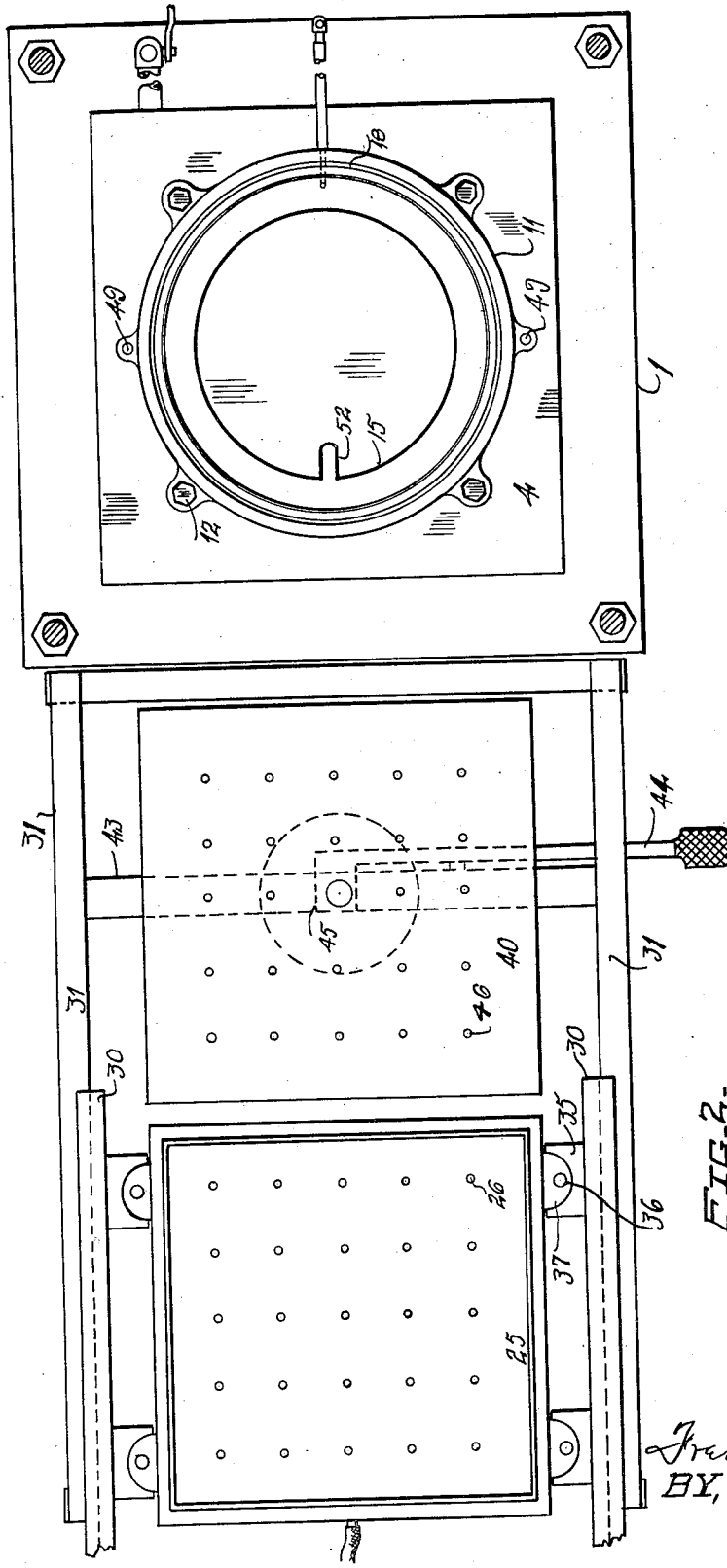

F. T. ROBERTS.
METHOD OF MAKING HOLLOW RUBBER ARTICLES.
APPLICATION FILED MAR. 12, 1917.
1,346,848.
Patented July 20, 1920.
3 SHEETS—SHEET 3.
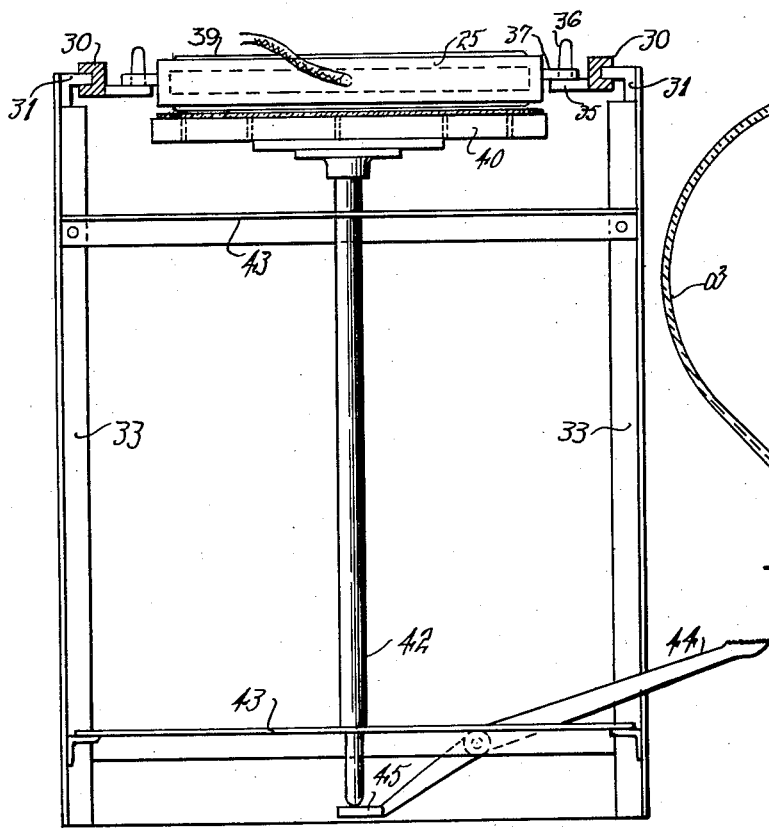
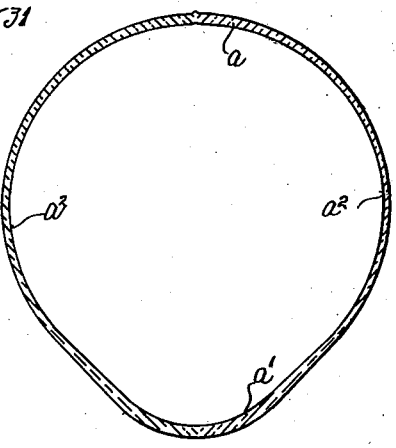
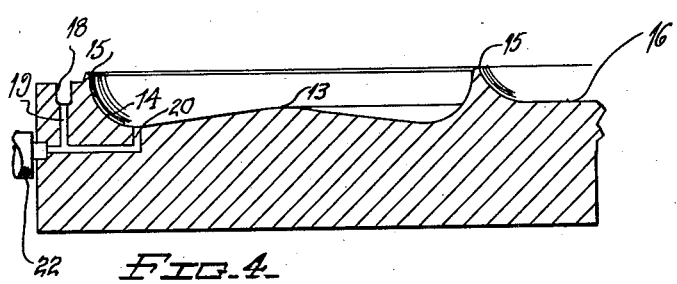
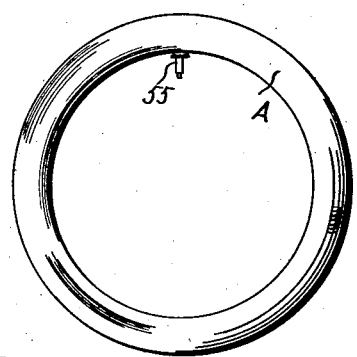
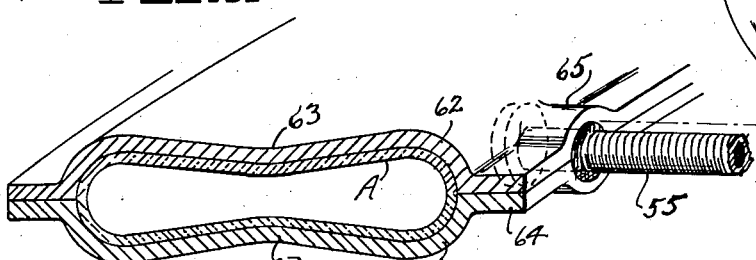
INVENTOR,
Fred Thomas Roberts,
BY Bates Macklin,
ATTYS

UNITED STATES PATENT OFFICE.

FRED THOMAS ROBERTS, OF CLEVELAND HEIGHTS, OHIO, ASSIGNOR, BY MESNE ASSIGNMENTS, TO PARAMOUNT RUBBER CONSOLIDATED, INC., OF PHILADELPHIA, PENNSYLVANIA, A CORPORATION OF DELAWARE.

METHOD OF MAKING HOLLOW RUBBER ARTICLES.

1,346,848.  Specification of Letters Patent.  Patented July 20, 1920.

Application filed March 12, 1917. Serial No. 154,072.

*To all whom it may concern:*

Be it known that I, FRED THOMAS ROBERTS, a citizen of the United States, residing at Cleveland Heights, in the county of Cuyahoga and State of Ohio, have invented a certain new and useful Improvement in Methods of Making Hollow Rubber Articles, of which the following is a full, clear, and exact description, reference being had to the accompanying drawings.

The object of this invention is to provide an improved, simple and effective method for making hollow rubber articles, such, for example, as inner tubes for pneumatic tires. The invention relates particularly, to a method of manufacturing two-part hollow rubber articles wherein the parts of the article are cut from a sheet and formed in a mold, which causes the edges to adhere together, and then removed to a vulcanizing mold in which they are seated by internal pressure.

The manner of carrying out this method of making rubber articles may be more readily understood in connection with the operation of an apparatus, illustrated in the accompanying drawings, to which the following description refers. The essential characteristics of the invention are set forth in the claims.

In the drawings, Figure 1 is a vertical section through a suitable press and forming molds and a sheet handling device associated therewith useful in carrying out my method; Fig. 2 is a plan of the same; Fig. 3 is a sectional view at right angles to Fig. 1, illustrating the construction of the sheet handling device; Fig. 4 is a radial sectional detail of the forming mold; Fig. 5 is a similar section through the vulcanizing mold; Fig. 6 is an elevation of a complete inner tube formed by this process and apparatus; Fig. 7 is a radial section through such a tube (on an enlarged scale), when in use.

My method contemplates the use of suitable forming molds. A suitable press for operating these preferably comprises a base member 1, upright struts 2 carrying a stationary platen 3, a movable platen 4 carried on a plunger 5 extending into a cylinder 6 and operated by hydraulic pressure. For this purpose water is forced into the cylinder through a pipe 7 under the control of a valve 8.

Secured to the stationary and movable platens of the illustrative embodiment shown are the forming molds 10 and 11 respectively held in position by cap-screws 12 extending through ears on the molds and engaging the platens (Fig. 2). These molds are preferably in the form of plates having shallow annular troughs formed in their adjacent sides. The trough surfaces are preferably concave at each side, as indicated at 12, and convex as at 13 between the concave portions so that when these cavities are brought into registration with sheets between them the sheets may be caused to take the form of a flat tube having convex portions at the inner and outer peripheries and concave sides. The sheets are trimmed at each side of the cavities by raised cutting edges 15 having abruptly beveled edges at their inner sides and sharp bevels at the sides away from the cavity. Inside of the cavity the mold plate has a depression 16 in which the portion of the rubber may fall when severed. Outside the cavity I provide an annular groove 18 and passages 19 and 20 communicating with the bottom of this groove and a low portion of the trough-shaped cavity. These passages are connected with a vacuum pipe 22 adapted to cause the seating of the rubber, as will be hereinafter described.

The rubber sheets indicated at R are brought to the mold plates in any suitable manner, preferably on opposite sides of a hollow carrier-plate 25 having small openings 26 leading from an interior cavity 27 to the exterior, whereby when the air is drawn from the interior of this plate through a tube 28 under the control of a valve 29, the sheets are securely held to the sides of this vacuum plate. This plate is shown as mounted on longitudinal slides 30 embracing rails 31 positioned at the upper portion of a stand comprising suitable uprights 33 and braces 34. The slides 30 are shown as having inwardly extending ears 35 carrying upwardly-projecting guide pins 36 slidably embraced by ears 37 on the plate 25, whereby this plate is supported and positioned while being adapted to be moved with the slides to bring it into the position shown in Fig. 1 between the forming molds or back to the position shown in Fig. 2. Beneath the path of this vacuum plate and between the two positions just mentioned is a horizontal table 40 mounted on a vertically movable standard 42 guided by transverse braces 43 and actuated by a foot-lever 44 having a lip 45 extending beneath the lower end of the standard.

This table is adapted to receive a sheet of rubber R and be raised to present the rubber to the under side of the plate 25, when the plate is in position directly above it, as indicated in dot-and-dash lines in Fig. 1. Here the rubber may be held to the under side of the plate and removed from the table by suction. Openings 40 are provided in the table to permit the removal of the rubber sheet therefrom by such suction.

The following description of the operation of the apparatus thus far described illustrates the preferred method of carrying out my process.

Starting with the plate 25 in the position shown in Fig. 2, a substantially square sheet of raw rubber is laid on the upper surface of the plate 25 and a similar sheet is laid on the table 40. The vacuum plate is then brought to a position directly over the table, the pedal 44 operated to raise the table, bringing the rubber sheet thereon into contact with the under side of the plate, whereupon the valve 29 may be operated to apply vacuum to this plate, thus drawing both the rubber sheets closely into contact therewith. The table 40 may then be lowered, leaving its sheet held to the under side of the vacuum plate, which is then moved to the position shown in Fig. 1, directly between the forming molds. The valve 8 is then operated to apply hydraulic pressure to the plunger 5, raising the lower forming mold 11 into contact with the rubber at the under side of the plate 25, and the raising movement is continued, carrying the plate 25 upwardly (such movement being permitted by reason of engagement of the ears 37 with the pins 36), bringing the upper sheet into contact with the upper mold member 10. Here the movement of the platen 4 is stopped, the valve 29 is operated to relieve the vacuum in the plate 25, and a valve 47, controlling the vacuum tubes 22 is opened, drawing the air from the mold cavities and from the groove 18, securely holding the sheets to the mold members. The platen 4 may then be lowered and the vacuum plate 25 withdrawn, leaving the sheets held to the molds by vacuum. This plate is then moved to the position shown in Fig. 2, and the rubber sheets may again be placed upon this plate on the table 40, while the forming operation is continued in the press.

The application of vacuum to the mold members is continued until the rubber sheets are stretched tightly into the mold cavities. The rubber is prevented from wrinkling by the suction at the groove 18, which holds the sheet tightly to the mold around the outside of the cavity. Ribs 49 on the vacuum plate 25 press the rubber into contact with the edges of this groove and these ribs register with the molds by reason of stop pins 50 and 51, the slides 30 and the frame of the stand respectively. While still applying the vacuum to the forming molds, the platens are brought together until the cutting edges 15 meet, entirely severing the rubber within the mold cavities from that at each side thereof, thus forming a substantially flat ring comprising two annular members having their edges pinched together by the bevel surfaces of the cutting edges, and thus caused to adhere. To insure these edges meeting accurately, I provide dowel pins 48 on one of the mold members adapted to enter openings in bosses 49 on the other. Upon separating the forming molds the tube may be removed and placed in a vulcanizing mold. The walls of the tube are held separated, and in substantially the shape given them by the mold, with the atmosphere imprisoned therein. The severed portions of the rubber may be removed and saved, thus preventing waste.

In the making of inner tubes for pneumatic tires, it is desirable to secure the valve stem 55 between the meeting edges of the rubber rings severed from the sheets, so that when a tube thus formed is vulcanized it may be complete. Accordingly I prefer to loop the cutting edge 15 inwardly as indicated at 52 in Fig. 2, and within this loop provide a cavity into which the rubber is drawn by the suction, so that before bringing the forming molds together to sever the sheets the valve stem may be laid on rubber in the lower mold in this cavity, with its head in the concave portion 12 of the trough. Now when the mold members are brought together and severed, the rubber is caused to lie closely about the shank of the valve stem and the sheets are severed entirely around the stem by the edges 52.

The vulcanizing mold illustrated in Fig. 5 preferably comprises two trough-shaped members formed of pressed metal having convex portions 62 complementary to the convex portions of the tube A, while at the sides the cavity extends inwardly in concave form at 63, fitting the concave sides of the tube A. Flanges 64 of the mold members provide for securing the mold members together by bolts or clamps. At one point these flanges are bowed outwardly, as indicated at 65, to surround the valve stem and press the rubber into contact therewith, while the remaining portion of the rubber surrounding the shank may be trimmed off at the inner sides of the flanges before vulcanization, thus permitting the trimmed-off portions to be re-used. A considerable number of tubes carried in such molds are inflated therein, pressing the walls of the tube tightly to the inner surfaces of the mold. These molds are then placed in a vulcanizing chamber and subjected to a suitable heat to finish the curing of the rubber.

The tube thus formed is adapted to normally lie flat and be passed radially into the opening at the inner periphery of the tire casing without danger of twisting or creasing. I have found that such a tube, when expanded, presents a thicker portion of wall at the tread and bead, as at $a$ and $a'$, while the sides $a^2$ are stretched thin. This result is shown, described and claimed, in my application No. 154,070, filed on an even date herewith.

While I have illustrated my process by describing a method of manufacturing a particular form of tube it is obvious that this treatment of such sheets of rubber may be advantageously used in making foot-ball bladders, hollow rubber balls, bulbs, and the like, it being only necessary to provide properly shaped cavities in the forming molds and means to trim off the rubber outside the cavities, in the manner above described.

The present invention relates to the method of making hollow rubber articles including the retaining of the rubber sheets across the mold cavities and the forming of them into the hollow rubber articles. The apparatus illustrated comprises various novel features which are claimed in other applications of mine to which reference is made, as follows:

Serial No. 221,961, filed March 12, 1918, for a mold for making hollow rubber articles; Serial No. 230,625, filed April 25, 1918, for an apparatus for making hollow rubber articles; Serial No. 248,280, filed August 5, 1918, for an apparatus for making hollow rubber articles, and Serial No. 323,851, filed Sept. 15, 1919, for apparatus for making pneumatic inner tubes.

Having thus described my invention, what I claim is:

1. The method of making hollow rubber articles, comprising placing two sheets of rubber across mold cavities, drawing the sheets into the cavities by vacuum, bringing the mold members together and trimming off the sheets at the edges of the mold cavities, then removing the article formed by such cavities, placing the same in a vulcanizing mold complementary to its exterior, introducing pressure fluid within the article while in such mold, and subjecting the same in this condition to a vulcanizing heat.

2. The method of making hollow rubber articles, comprising placing sheets of rubber over registering mold cavities and holding the rubber in position around the outside of the cavity by applying vacuum to a surrounding groove while drawing the article into the mold by vacuum, then bringing the mold parts together to cause the meeting edges to adhere.

3. The method of making hollow rubber articles, comprising placing sheets of rubber over registering mold cavities and holding the rubber in position around the outside of the cavity by applying vacuum to a surrounding cavity while drawing the article into the mold by vacuum, then bringing the mold parts together to sever the portion of rubber within the cavity from the surrounding sheet, and causing the meeting edges to adhere.

4. The method of making hollow rubber articles having a valve vulcanized in position, comprising placing rubber sheets across mold cavities, drawing the same into the cavities by suction, there being a cavity for receiving the valve, and then bringing the mold members together to trim off the material surrounding the cavities and the valve, and then subjecting the article to a vulcanizing heat.

5. The method of making hollow rubber articles having a valve vulcanized in position, comprising placing rubber sheets across mold cavities, drawing the same into the cavities by suction, there being a cavity for receiving the valve, and then bringing the mold members together to trim off the material surrounding the cavities and surrounding the valve, then subjecting the article to a vulcanizing heat while in a complementary mold, trimming off the surplus rubber about the valve while in a complementary mold.

6. The method of making inner tubes for pneumatic tires, consisting of placing sheets of raw rubber across cavities in mold members, drawing the rubber into the cavities by vacuum and into a groove leading to the cavity at one side, laying the usual valve stem in such groove, then bringing the mold members together to form the tube by trimming off the rubber around the cavities and around the valve stem, placing such tube with the valve stem therein in a vulcanizing mold, and trimming off the surplus of rubber around the valve stem before vulcanization.

7. The method of making inner tubes for pneumatic tires, consisting of pneumatically forcing two sheets of rubber stock into mold cavities which are annular grooves of materially less depth than a hemisphere, bringing two such molded parts together to produce a flattened hollow annular rubber ring with its line of juncture at the outer and inner periphery, and vulcanizing it in substantially such shape whereby when blown into form for use the rubber is stretched at the sides.

8. The method of making inner tubes for pneumatic tires consisting of pneumatically seating rubber stock in annular grooves which are bowed up internally to have a depth materially less than half the cross section of the tube in use, bringing two of such seated rubber members together to make a complete tube, trimming off the rubber stock adjacent to the outer and inner periphery of such tube, and thereafter vulcanizing the tube while held in a shape substantially corresponding to that in which it is formed to make a tube which has a vertical dimension corresponding to its dimension in use and a horizontal dimension materially less than its horizontal dimension in use.

9. In the process of making hollow rubber articles, the steps which consist in pneumatically fastening a sheet of rubber stock in a region outside of a mold cavity and while the stock is so fastened seating an intermediate portion thereof in the mold cavity.

10. The method of giving rubber a molded form, which consists in pneumatically fastening a sheet of rubber stock at a zone surrounding a mold cavity and forcing an intermediate portion of the sheet into the cavity while the restriction of the surrounding zone is maintained.

11. The method of seating sheet rubber in a mold cavity, which consists in fastening a portion of a sheet by suction applied in a region outside of the cavity and forcing an intermediate portion of the sheet into the cavity.

12. The method of seating sheet rubber in a mold cavity, which consists in fastening the edge portion of a sheet by suction applied in a zone surrounding the cavity and forcing an intermediate portion of the sheet into the cavity while the edge portion is so fastened.

13. In the process of making hollow rubber articles, the steps which consist in pneumatically fastening a sheet of rubber stock in a region outside of a mold cavity and pneumatically seating a portion thereof opposite the mold cavity in said cavity.

14. The method of seating sheet rubber in a mold cavity, which consists in pneumatically fastening the edge of a sheet in a region surrounding the cavity and forcing an intermediate portion of the held sheet into the cavity by establishing a superior pneumatic pressure on the face of the sheet opposite the cavity.

15. The method of seating sheet rubber in a mold cavity, which consists in fastening the edge of the sheet by suction applied in a region surrounding the cavity and forcing an intermediate portion of the sheet into the cavity by pneumatic pressure.

16. The method of seating sheet rubber in a mold cavity, which consists in fastening the sheet by suction in a region outside of the cavity and seating an intermediate portion of it by suction applied to the cavity.

17. The method of seating sheet rubber stock in a mold cavity, which consists in fastening the margin of a sheet by suction applied in an annular region surrounding the mold cavity and drawing the intermediate portion of the sheet into said cavity by suction applied at the cavity.

18. In the process of making rubber articles, the step which consists in pneumatically fastening a sheet of rubber stock in a region surrounding a mold cavity.

19. In the process of making hollow rubber articles, the step which consists of applying a vacuum to rubber stock in an annular region surrounding a mold cavity, whereby the stock is effectively held around the cavity.

20. The process of making hollow rubber articles, comprising pneumatically fastening two sheets of rubber stock in regions outside of mold cavities across which the stock lies, seating the intermediate portion of such sheets of stock in the respective cavities, bringing the members carrying the cavities together to cause the two pieces of seated stock to abut and adhere around the cavities.

21. A method of making hollow rubber articles, consisting of fastening rubber sheets across the mouths of mold cavities, by means of pneumatic pressure supplied in regions outside of the cavities, pneumatically seating stock in such cavities, bringing such seated stock together and cutting off from the surrounding margin.

22. The process of making hollow rubber articles, comprising pneumatically fastening two sheets of rubber stock in regions outside of mold cavities across which the stock lies, seating the intermediate portion of such sheets of stock in the respective cavities, bringing the members carrying the cavities together to cause the two pieces of seated stock to abut and adhere around the cavities.

23. The method of making hollow rubber articles, consisting of fastening rubber sheets across the mouths of mold cavities, by means of suction supplied to regions surrounding the cavities, pneumatically seating stock in such cavities, bringing such seated stock together and cutting off from the surrounding sheet inside of the region where it is fastened.

24. The method of making hollow rubber articles, involving the employment of two mold members having registering cavities comprising the steps of fastening to each mold member a sheet of rubber stock by means of suction applied in a region surrounding said cavities, seating such fastened stock in the cavities by means of suction applied to the cavities, bringing two of such seated portions together under pressure to join them and at the same time shear off separate stock around the registering mold cavities and within the region where the stock is held by suction.

In testimony whereof, I hereunto affix my signature.

FRED THOMAS ROBERTS.